United States Patent Office 3,310,110
Patented Mar. 21, 1967

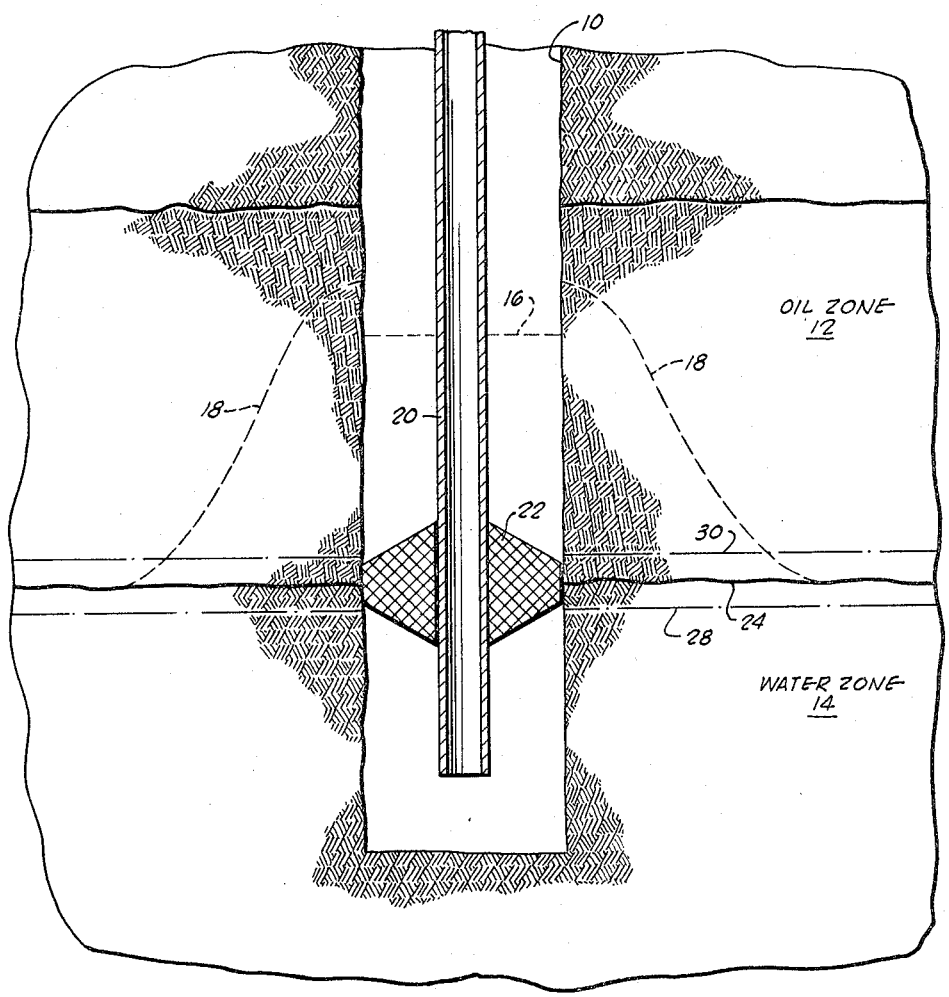

3,310,110
SHUTTING OFF WATER FROM OIL WELLS
William L. Martin, Ponca City, Okla., assignor to Continental Oil Company, Ponca City, Okla., a corporation of Delaware
Filed Sept. 14, 1964, Ser. No. 396,265
8 Claims. (Cl. 166—32)

This invention relates generally, as indicated, to minimizing the flow of water into producing oil wells. More particularly, but not by way of limitation, the invention relates to an improved method of minimizing entry of water into an oil zone and an oil well from a water zone underlying the oil zone.

In many oil fields there is a water zone underlying the oil zone and the water tends to cone up around a production well bore penetrating the oil zone to block off the flow of more viscous crude oil into the well. When water does enter the well bore it must be removed with the oil and materially increases the total cost of producing the oil. Also, water coning up into an oil zone around a producing well decreases the relative permeability of the zone to oil and inhibits the flow of the more viscous crude oil into the well bore, as indicated, and thus reduces the total volume of oil that may be recovered from the oil zone.

Heretofore, the most popular technique utilized for minimizing the coning of water upwardly into an oil zone around a producing well was use of what is known as a pancake squeeze. In this technique, the wall of the well bore is perforated or notched at the interface between the oil zone and the water zone, and then a cement slurry is pumped into the well bore and pressurized at the level of the interface. The increased pressure of the cement slurry fractures the formation and forces the cement radially outwardly into the formation around the well bore along the approximate plane of the interface between the oil and water zones. Upon hardening, the cement forms an impermeable barrier between the oil and water zones and does tend to reduce the water coning effect. However, the distance into the formation to which the cement may be squeezed is limited, and the resistance to the outward squeezing of the cement varies around the circumference of the well bore, such that the resulting cement pancake is of irregular configuration and frequently terminates a very short distance radially outward from the well bore at one or more points. It is also difficult, if not impossible, to control the plane of fracture at the interface between the two zones, or in fact to be sure that a horizontal, rather than a vertical, fracture is created. A further disadvantage of a pancake squeeze is that some kind of fracture is required to insure penetration of the cement into the formation for any appreciable distance from the well bore, since normal oil well cement is a slurry of solids that will not flow through intergranular porosity. Thus, the degree of protection afforded by a pancake squeeze against the entrance of water into the oil zone and into the producing well is limited.

The present invention contemplates a novel method of minimizing the intrusion of water from a water zone into an adjacent oil zone and into a producing well penetrating the oil zone by the formation of an impermeable barrier at the interface between the oil and water zones around the well bore for a substantial distance radially outward around the well bore. Broadly stated, the method is performed by injecting a liquid from the well bore into the oil zone which is miscible with the oil in the oil zone and which contains an oil-soluble reactant, and simultaneously injecting water from the well bore into the water zone, with the injected water containing a water-soluble material which will react with the oil-soluble reactant to form insoluble precipitates. The oil-soluble reactant flowing in the oil zone will contact the water-soluble material flowing in the water zone at the interface between the oil and water zones and form an impermeable barrier along this interface and in a transition zone a short distance above and a short distance below this interface. The impermeable barrier may be extended a substantial distance radially outward from the well bore by continued injection of the oil-soluble and water-soluble materials in the oil zone and water zone as specified. The method also contemplates the formation of an impermeable barrier around the well bore at the level of the water zone by a later injection of the oil-soluble reactant into the portion of the water zone immediately surrounding the well bore. Therefore, when the well is again placed on production, the water will be confined to the water zone and a minimum amount of water will enter the well bore, either directly from the water zone or indirectly through the oil zone, and a substantially greater amount of the oil may be recovered from the oil zone.

An object of this invention is to increase the oil-water ratio of producing oil wells.

Another object of this invention is to minimize the coning of water into an oil zone around a producing oil well from an underlying water zone.

Another object of this invention is to decrease the flow of water into a producing oil well from a water zone penetrated by the well, either directly from the water zone into the well or indirectly from the water zone through an oil zone into the well.

A further object of this invention is to form an impermeable barrier between an oil zone and a water zone for an increased distance around a well bore.

A still further object of this invention is to provide a method of minimizing the flow of water into a producing oil well which is simple and economic to perform and requires only the use of conventional and economical equipment and materials.

Another object of this invention is to increase the total recovery of oil from an oil zone.

Other objects and advantages of the invention will be evident from the following detailed description when read in conjunction with the accompanying drawing which illustrates the invention.

The single drawing is a schematic vertical sectional view through a well bore completed for practicing this invention.

In more detail, reference character 10 designates a well bore penetrating an oil zone 12 which overlies a water zone 14. Normally the well 10 will terminate within the oil zone 12, as indicated by the dashed line 16, to produce oil from the oil zone. However, during normal production of the well, water from the water zone 14 tends to cone up around the well bore 10 into the oil zone 12 as indicated by the dash lines 18 and thus enter the well bore for intermingling with the oil in the well bore. This coning effect also blocks the flow of the more viscous crude from the oil zone 12 into the well bore as previously indicated.

In accordance with the present invention, the well bore is first extended down into the water zone 14 as shown by solid line in the drawing. A string of tubing 20 is then suspended in the well bore 10 down to the level of the water zone 14. A suitable packer 22 is secured in the well bore 10 around the tubing 20 at the level of the interface 24 between the oil zone 12 and water zone 14 to isolate the well bore above and below the level of the interface 24. It will thus be seen that the tubing 20 is in communication with the water zone 14 through the portion of the well bore below the packer 22, and the well bore above the packer 22 is in communication with the oil zone 12.

When the tubing 20 and packer 22 are placed as illustrated in the drawing, a liquid miscible with the oil in the oil zone 12 is pumped downwardly through the well bore 10 and then radially outward into the oil zone 12 above the packer 22. This liquid may be either produced crude oil or any desired solvent which is miscible with the oil in the oil zone 12. The initial injection of this liquid into the oil zone 12 tends to displace the water existing in a cone around the well bore (as indicated by the dash line 18) back downwardly into the water zone 14 and thus tends to increase the relative permeability of that portion of the formation to oil and makes the actual interface 24 between the oil zone 12 and water zone 14 extend in a horizontal direction from the well bore. Simultaneously, it is preferred to start the pumping of water downwardly through the tubing 20 and the lower portion of the well bore into the water zone 14 to provide pressure equilibrium at the interface 24, such that the oil does not invade the water zone and water does not invade the oil zone. Reactants which will form insoluble precipitates are then separately added to the oil and water being injected into the oil zone 12 and water zone 14, respectively.

The reactant added to the liquid being injected into the oil zone 12 may be, for example, oil-soluble organic acids (such as those commonly used in oil field stimulation work) such as ethyl acetate, ethyl oxalate, propyl formate, ethyl silicate, ethyl chloride, acetic acid and various oil-soluble sulfonates; various inorganic acids such as carbon dioxide, hydrogen chloride or hydrogen sulfide; or oil-soluble inorganic bases, such as gaseous ammonia.

The material added to the water being injected into the water zone 14 will, of course, be water-soluble and capable of reacting with the oil-soluble reactant injected into the oil zone 12 to form the insoluble precipitates as mentioned. Examples of materials which are suitable for injection into the water zone 14 are sodium silicate, and ferrous and aluminum sulfate.

Table I shows several commercially available sodium silicate solutions which are useful for the purpose described. An especially useful commercial silicate solution is one having a density of 11.5 pounds per gallon, a silica/alkali ratio of 3.2/1, and a relative density of 11.5 degrees Baumé. This solution is relatively viscous and can be diluted to about 70 percent concentration for use in tight formations.

TABLE I

| $SiO_2/Nd_2O$ wt. ratio | Total Solids, wt. percent | Specific Gravity | Viscosity at 68° F., cps. |
| --- | --- | --- | --- |
| 2.50 | 36.9 | 1.41 | 50 |
| 2.90 | 43.0 | 1.48 | 960 |
| 3.22 | 37.6 | 1.39 | 180 |
| 3.75 | 32.1 | 1.32 | 220 |

The preferred materials are the various oil soluble acids, such as ethyl chloride or carbon dioxide for the oil zone, and sodium silicate for the water zone, since these materials are economical and normally readily available. When carbon dioxide and sodium silicate are used, the crude oil or solvent should be saturated with carbon dioxide at the reservoir pressure. Alternatively, liquid carbon dioxide can be used in the oil zone. The total amount of either material injected into the oil zone and the water solution injected into the water zone may be varied as desired, with increased concentrations providing increased effectiveness in forming the impermeable barrier as will be described. It will be understood, of course, that the material added to the liquid injected into the oil zone must be retained in solution in order to be efficiently carried radially outwardly through the oil zone, and the same applies to the material added to the water being injected into the water zone 14. However, when sodium silicate is being used, it increases the viscosity of the water solution and must, therefore, be limited in order that the water solution will be pumpable through the water zone. A concentration of 150 to 210 pounds of sodium silicate per barrel of water will be suitable in most operations, considering moderately permeable formations and conventional pumping equipment.

When the reactants referred to above are added to the liquid being injected into the oil zone and the water being injected into the water zone, these reactants will make contact and/or mix at approximately the level of the interface 24 and form an impermeable barrier in the formation at this level. It will be seen that by continued injection, the reactants may be made to come in contact at greater and greater distances radially outward from the well bore 10 to increase the diameter of the impermeable barrier to a substantial size to prevent the upward flow of water from the water zone 14 into the oil zone during subsequent production of the well.

This invention also contemplates increasing the rate of injection of the oil-soluble material into the oil zone 12, with or without a corresponding reduction in the rate of injection of the water-soluble material in the water zone 14 to cause a slight penetration of the oil-soluble material downwardly into the water zone, as indicated by the dashed line 28. Cyclicly, an increase in the rate of injection of the water-soluble material in the water zone 14 and a decrease in the rate of injection of the oil-soluble material in the oil zone 12 provides a slight penetration of the water-soluble material upwardly into the oil zone 12, as indicated by the dashed line 30. With this type of alternating sequence of operations, the vertical thickness of the barrier at the interface 16 may be increased to the levels of the dashed lines 28 and 30 to provide increased resistance to flow of water from the water zone into the oil zone during subsequent production of the well.

When the impermeable barrier has been extended outwardly from the well bore 10 the desired distance, the injection of the oil-soluble and water-soluble materials is stopped. The tubing 20 is then swabbed to remove the water-soluble material and water therefrom. This action reduces the pressure in the water zone and further insures contact of the water soluble and oil soluble reactants at the interface between zones. Then, oil or solvent, with one of the specified oil-soluble reactants therein, is pumped downwardly through the tubing 20 into the lower portion of the well bore and radially outward into that portion of the water zone 14 immediately surrounding the well bore 10. The oil-soluble reactive material reacts with the water-soluble material remaining in this portion of the water zone 14 to form an impermeable barrier circumferentially around the well bore throughout the height of the water zone 14. With this final step in the method, it is normally unnecessary to pack off the well bore at the level of the interface 24 during subsequent normal production of the well, since water from the water zone will then be prevented from migrating directly into the well bore.

In those instances where oil-soluble gaseous reactants are used (for example $CO_2$ or $H_2S$), the pressure in the water zone can be allowed to dissipate by interrupting water injection, or by allowing some of the previously injected silicate or other water-soluble reactant solution to back flow out of the water zone. The resulting pressure decrease would be transmitted to the oil zone through any imperfections in the impermeable barrier, which would cause the $CO_2$ or $H_2S$ to come out of solution in the oil and flow into the water zone where it would immediately react with the sodium silicate or ferrous sulfate solution to form an insoluble precipitate, and/or lower the pH of the silicate solution enough to cause a gel to form. This would essentially immobilize the silicate solution over a wide area at the interface between zones.

To further detail my invention, I will now outline a field application of the techniques just described. North Tisdale Field, Wyoming, is a classic example of what is commonly called a bottom water drive reservoir. The oil saturated sand at North Tisdale is about 50 feet thick and it is underlain by a fresh water zone about 15 feet thick. There is a sharp demarcation or "interface" between the oil and water zones at North Tisdale, the oil zone being heavily saturated with viscous black oil and the water zone being completely devoid of oil.

Production wells at North Tisdale are usually "set high" in the oil zone; i.e., not drilled as deep as the water zone in order to retard the formation of water cones and subsequent loss of production rate. In spite of this method of completion, a new well will begin to produce water in a few weeks or months after being placed on production; and in a short time the water/oil ratio is extremely high and the oil production rate is undesirably low. This undesirable situation makes the total operation so uneconomical that only about 6 percent of the oil can be produced by these conventional methods.

There are no appreciable differences in the rock properties of the oil and water zones at North Tisdale. The sandstone has a porosity of about twenty-six percent and a permeability of about 800 md. The oil has a viscosity of about 200 cps. and the water is fresh (i.e., low solids concentration). However, as previously described, water cones into a well bore from the underlying water zone after a few months of production.

The first step of the treatment is to extend the depth of the well as shown in the drawing so that oil and water solutions can be selectively injected into the oil and water zones respectively. A retrievable packer is then run on 2½-inch injection tubing and set at the approximate interface between the oil and water zones.

Since the crude oil viscosity of 200 cps. is approximately equal to the viscosity of one of the commercially available sodium silicate solutions, these two liquids are used to effect an impermeable barrier at the oil-water interface. Accordingly, suitable surface equipment is assembled to mix and pump the reactants and the oil and water through the well bore annulus and the tubing respectively. Carbon dioxide is used as the oil-soluble reactant in the amount of approximately 300 s.c.f./bbl. which is approximately the saturation concentration for $CO_2$ in the 20° API Tisdale crude oil at 80° F. and 600 p.s.i. The crude oil and carbon dioxide are mixed by simultaneously pumping the crude oil and the liquified carbon dioxide into a small high-pressure oil field separator located at the well head. The liquid crude oil (saturated with carbon dioxide) is flowed directly out of the separator tank into the casing of the oil well and thence into the oil sand above the packer.

In order to compensate for the decreased viscosity of the crude oil due to the solubility of carbon dioxide, the commercial sodium silicate is diluted with fresh water to a 70 percent concentration. This provides a concentration of 150 pounds sodium silicate per barrel of water and reduces the viscosity to approximately that of the crude oil, or to about 20 cps. at 80° F. The adjustment of viscosity facilitates the control of the oil-water interface during injection of the two solutions, but similar viscosities are not required.

At North Tisdale, since we have a relatively homogeneous sandstone that is the same in the water zone as it is in the oil zone, one can easily arrive at the relative injection rates required to promote the radial growth of a horizontal impermeable reaction zone at the interface between the oil and water layers. Thus, in order to prevent vertical migration across the interface one must insure that there is no vertical pressure gradient or component thereof. This can best be approximated by insuring that the radial pressure gradients in each phase are similar during injection, except when they are purposely changed to encourage vertical mixing and therefore reaction of the active components.

The radial pressure distribution due to flow of liquids in the vicinity of well bores is given by the well known Darcy equation:

$$Q = \frac{Kh(P_r - P_{r_w})}{\mu \ln r/r_w}$$

Therefore the relative injection rates require to provide similar radial pressure distributions and therefore zero vertical pressure gradients and zero vertical flows (and therefore a horizontal interface) are:

$$\frac{Q_o}{Q_w} = \frac{K_o h_o}{K_w h_w} \frac{\mu_w \ln}{\mu_o \ln}$$

$$\frac{Q_o}{Q_w} = \left(\frac{K_o}{K_w}\right)\left(\frac{\mu_w}{\mu_o}\right)\left(\frac{h_o}{h_w}\right)$$

where K is permeability, md., $\mu$ is viscosity, cp., and $h$ is thickness, ft.

At Tisdale—

$K_o = .800 \times 0.4 = .32$ darcy
$K_w = .800 \times 0.6 = .48$ darcy
$\mu_o = \mu_w = 20$ cps.
$h_o = 50$ ft.
$h_w = 15$ ft.

$$\frac{Q_o}{Q_w} = \frac{0.32}{0.48}\left(\frac{20}{20}\right)\left(\frac{50}{15}\right) = 2.22$$

The injection rates at 600 p.s.i. injection pressure are 100 barrels of oil per day and 50 barrels of sodium silicate per day. Injection is continued for 10 days at these rates to establish a horizontal interface with a radius of about 50 ft. from the well bore. During this time about 5,500 barrels of 70 percent sodium silicate and about 12,000 barrels of oil saturated with carbon dioxide will be injected.

During the ten-day period the relative injection rates of the two streams are cycled so that for a time oil is injected at 3 times the rate of the silicate and then the rate is decreased so that the injection rates are equal. This causes the two reacting liquids to mix at the interface between the oil and water zones.

After the ten-day injection period, the oil zone is shut in and the injection tubing is swabbed to recover sodium silicate solution for use in another well. This causes the pressure is the water zone to fall and this pressure decrease is transmitted to the oil zone through any imperfections that existed in the impermeable zone created at the interface by the preceding methods. As the pressure in the oil zone decreases locally in the vicinity of these imperfections, the carbon dioxide comes out of solution in the oil and flows into the sodium silicate solution even more rapidly than does the gas saturated crude oil. The gaseous carbon dioxide is immediately dissolved in the undersaturated sodium silicate solution which lowers the pH of this solution locally and causes it to form a rigid gel or even an insoluble precipitate of sodium silicate in the permeable porosity of the water zone. By this means the last traces of permeability between the two zones are sealed. Swabbing is stopped prior to the time all of the sodium silicate is removed or back flowed into the injection tubing, so that some residual is left in the vicinity of the well bore. This residual is then contacted with the reactant oil by simply connecting the tubing and the well bore above the packer together. They higher pressure remaining in the oil zone is sufficient to force carbon dioxide saturated crude oil and evolved gaseous carbon dioxide into the water zone in the vicinity of the well bore below the packer. Only a small amount of oil flows into the water zone by this means before the insoluble precipitate or gel of sodium silicate forms and plugs the well bore at the level of the water zone.

The oil zone is then blown down through the well bore annulus, during which procedure all of the injected oil is recovered at high rates, and some production stimulation is obtained. No water production will be observed initially or during the months following completion of the treatment.

It will be readily understood by those skilled in the art that the apparatus illustrated in the drawing and previously described is to illustrate only one arrangement for carrying out this invention. Packers similar to the packer 22 could be used at some point higher in the oil zone 12 and closer to the bottom of the water zone 14 and multiple tubings could be used to, in some instances, more efficiently inject the oil-soluble and water-soluble reactants at the desired locations and conserve reactants.

From the foregoing, it will be apparent that the present invention will minimize the migration of water into a producing oil well. When the impermeable barrier is formed at the interface between the oil zone and the water zone, the water cannot flow upwardly into the oil zone and then into the producing well to interfere with the efficient production operation. The water coning effect is either completely eliminated or substantially minimized by the impermeable barrier. By use of the present method, the maximum amount and rate of oil production may be obtained from the oil zone. The water-soluble reactant material injected in the water zone will be effectively trapped therein and will not flow back into the well bore to cause plugging or fouling in the subsequent production of the well. The method requires only the use of readily available and economical equipment and materials and will effectively increase the oil/water ratio of a producing well.

Changes may be made in the arrangement of steps and in the selection of materials heretofore set forth in this specification and illustrated in the drawing without departing from the spirit and scope of the invention as defined in the following claims.

I claim:
1. A method of minimizing the intrusion of water into an oil zone and into a well bore penetrating the oil zone from a water zone underlying the oil zone, comprising the steps of:
   extending the well bore into the water zone;
   injecting a liquid into the oil zone which is miscible with the oil in the oil zone and which contains an oil soluble reactant;
   simultaneously injecting water into the water zone, with the injected water containing a water-soluble material which will react with the oil-soluble reactant to form an insoluble precipitate; and
   contacting the injected oil solution with the injected water solution at approximately the interface between the oil and water zones to form an impermeable barrier around the well bore between said zones.

2. A method as defined in claim 1 wherein the oil-soluble reactant is ethyl chloride and the water-soluble material is sodium silicate.

3. The method defined in claim 1 wherein the oil-soluble reactant is carbon dioxide and the water-soluble material is sodium silicate.

4. A method as defined in claim 1 characterized further to include the steps of increasing the rate of injection of the oil solution and reducing the rate of injection of the water solution, and, then, increasing the rate of injection of the water solution and decreasing the rate of injection of the oil solution to increase the contact between the oil solution and the water solution at the interface between the oil zone and the water zone and thus increasing the vertical thickness of the impermeable barrier.

5. A method as defined in claim 1 characterized further to include the step of stopping the injection of said water solution into the water zone and injecting a volume of said oil solution into the water zone around the well bore to form an impermeable barrier around the well bore throughout the height of the water zone.

6. A method of minimizing the intrusion of water into an oil zone and into a well bore penetrating the oil zone from a water zone underlying the oil zone, comprising the steps of:
   extending the well bore into the water zone;
   injecting a liquid into the oil zone through the well bore to displace water from the oil zone around the well bore, said liquid being miscible with the oil in the oil zone; then
   adding an oil-soluble reactant to said liquid being injected into the oil zone;
   simultaneously injecting into the water zone water containing a water-soluble material which will react with said oil-soluble reactant to form an insoluble precipitate; and
   contacting the oil solution with the water solution at approximately the interface between the oil zone and the water zone to form an impermeable barrier at said interface.

7. The method of minimizing the intrusion of water into an oil zone penetrated by a well bore from a water zone underlying the oil zone, comprising the steps of:
   extending the well bore into the water zone;
   suspending a tubing in the well bore down to the level of the water zone;
   placing a packer in the well bore around the tubing at the level of the interface between the oil and water zones;
   injecting liquid through the well bore around the tubing into the oil zone, said liquid being miscible with the oil in the oil zone and containing an oil-soluble reactant;
   simultaneously pumping water down the tubing and into the water zone around the well bore, said water containing a water-soluble material which will react with the oil-soluble reactant to produce an insoluble precipitate; and
   contacting the oil solution with the water solution at approximately the interface between the oil and water zones to form an impermeable barrier at said interface.

8. The method defined in claim 7 characterized further to include the steps of:
   stopping the injection of said oil and water solutions when said barrier has been extended the desired distance from the well bore, then
   swabbing the tubing; then
   pumping a volume of said oil solution through the tubing and well bore below the packer into the water zone into contact with the water-soluble material standing in the water zone to form an impermeable barrier in the water zone around the well bore.

References Cited by the Examiner

UNITED STATES PATENTS

| 2,713,906 | 7/1955 | Allen | 166—38 |
| 3,013,607 | 12/1961 | Bond et al. | 166—38 |
| 3,175,611 | 3/1965 | Hower | 166—29 |

CHARLES E. O'CONNELL, *Primary Examiner.*

J. A. LEPPINK, *Assistant Examiner.*